United States Patent
Maschke et al.

(10) Patent No.: US 10,734,865 B2
(45) Date of Patent: Aug. 4, 2020

(54) ELECTRIC MOTOR HAVING IMPROVED COOLING

(71) Applicant: ebm-papst Mulfingen GmbH & Co. KG, Mulfingen (DE)

(72) Inventors: Matthias Maschke, Kupferzell (DE); Hartmut Messerschmidt, Ingelfingen (DE); Friedrich Schaffert, Schrozberg (DE); Wolfgang Ströbel, Blaufelden (DE); Michael Sturm, Bad Mergentheim (DE)

(73) Assignee: ebm-papst Mulfingen GmbH Co. KG, Mulfingen (DE)

( * ) Notice: Subject to any disclaimer, the term of this patent is extended or adjusted under 35 U.S.C. 154(b) by 409 days.

(21) Appl. No.: 15/565,241

(22) PCT Filed: Jan. 25, 2016

(86) PCT No.: PCT/EP2016/051414
§ 371 (c)(1),
(2) Date: Oct. 9, 2017

(87) PCT Pub. No.: WO2016/162130
PCT Pub. Date: Oct. 13, 2016

(65) Prior Publication Data
US 2018/0076693 A1    Mar. 15, 2018

(30) Foreign Application Priority Data
Apr. 9, 2015 (DE) .................. 10 2015 105 377

(51) Int. Cl.
*H02K 9/14* (2006.01)
*H02K 11/33* (2016.01)

(52) U.S. Cl.
CPC ............... *H02K 9/14* (2013.01); *H02K 11/33* (2016.01)

(58) Field of Classification Search
CPC . H02K 9/14; H02K 5/00; H02K 11/33; H02K 5/04
See application file for complete search history.

(56) References Cited

U.S. PATENT DOCUMENTS 2,494,200 A * 1/1950 Ramqvist ................. H02K 9/06
                                                            310/52
3,538,361 A    11/1970 Hilterbrick et al.
(Continued)

FOREIGN PATENT DOCUMENTS

DE       87 09 364        11/1988
DE       196 36 723 A1    3/1997
(Continued)

OTHER PUBLICATIONS

International Search Report, International Serial No. PCT/EP2016/051414, dated Oct. 13, 2016, 4 pages.

*Primary Examiner* — Emily P Pham
(74) *Attorney, Agent, or Firm* — Dickinson Wright PLLC

(57) ABSTRACT

The invention relates to an electric motor comprising an electronics housing having motor electronics accommodated therein and a stator housing arranged axially at a distance from the electronics housing, wherein, axially between the electronics housing and the stator housing there is arranged a twin-flow cooling wheel which, during operation, generates a first cooling air stream along the electronics housing and a second cooling air stream along the stator housing and/or at least one bearing shield adjoining the stator housing axially.

13 Claims, 2 Drawing Sheets

(56) References Cited

U.S. PATENT DOCUMENTS

| | | | |
|---|---|---|---|
| 2004/0256923 A1 | 12/2004 | Cleanthous et al. | |
| 2007/0095075 A1* | 5/2007 | Frank | F28D 15/0266 62/48.2 |
| 2014/0300221 A1* | 10/2014 | Linnemann Nielsen | H02K 11/33 310/54 |
| 2015/0069861 A1* | 3/2015 | Buttner | H02K 1/32 310/43 |
| 2015/0263591 A1* | 9/2015 | Maschke | H02K 5/22 310/62 |

FOREIGN PATENT DOCUMENTS

| | | |
|---|---|---|
| DE | 198 59 930 A1 | 6/2000 |
| DE | 10 2004 036281 A1 | 11/2005 |
| JP | H11 313465 A | 11/1999 |

\* cited by examiner

ELECTRIC MOTOR HAVING IMPROVED COOLING

RELATED APPLICATIONS

This application claims priority to German Patent Application No. 10 2015 105 377.2, filed on Apr. 9, 2015; and PCT/EP2016/051414, filed Jan. 25, 2016.

TECHNICAL FIELD

The invention relates to an electric motor with an electronics housing and therein integrated motor electronics and a stator housing arranged axially at a distance from the electronics housing, which is cooled by a cooling wheel that generates twin-flow cooling air streams independent of each other. In particular, the invention relates to an electric motor for operating a ventilator.

BACKGROUND

The output area and the lifetime of the electric motor are determined in particular according to the component temperatures reached during operation, above all the integrated motor electronics, the electrical output component, the bearings, and the motor drive components.

It is known from the state of the art that for improved output exploitation and lengthening of the lifetime of the motor, including its motor winding, ball bearing systems, and electronic components, active cooling should be provided onto the motor electronics. This is achieved in particular by implementing a cooling wheel, which sends a cooling air stream over the components to be cooled and thereby leads away the heat. Improved cooling of the components of the electric motor that are sensitive to temperature permit increased output performance at given surround temperatures and longer use of the motor at higher surround temperatures.

For example, DE 10 2012 107 109 A1 reveals a corresponding cooling design for an external rotor motor, in which a cooling stream is pushed actively over the electronics housing and over parts of the stator housing. The described solution in practice functions very well; however, it is not transferable to all types of electric motors, and in particular is not usable if the electronics housing is used axially separated from the stator housing.

BRIEF SUMMARY

The basic task of the invention is therefore to provide an electric motor that assures an optimized active cooling of all components of separate and independent electronics housing and stator housing that are sensitive to temperature even if these are used axially separated, as for example is often the case with an internal rotor motor. It is also the task of the invention to manage a motor that improves cooling and whose output and lifetime at an equal surround temperature is increased.

This task is solved by the combination of characteristics according to patent claim 1.

According to the invention, an electric motor is proposed that comprises an electronics housing with motor electronics included in it and a stator housing arranged at a distance from the electronics housing. A twin flow cooling wheel is set up between the electronics housing and the stator housing, and in operation generates a first air cooling stream along the electronics housing and a second cooling air stream along the stator housing; additionally or alternatively it generates these along a bearing shield adjoining the stator housing.

The twin flow cooling wheel is defined as a running wheel that during operation simultaneously generates two air streams that are either sucked in from both axial directions and blown out in a radial circumferential direction, or are sucked in from a radial circumferential direction and blown out in both axial directions. A twin flow cooling wheel may also work through the direct connection of two conventional running wheels. The movement direction of the cooling air streams is thereby dependent on the blade geometry of the cooling wheel and/or its rotating direction. The implementation of the twin flow cooling wheel permits cooling air streams that are separate from each other and are thereby independent, which in each case are implemented for cooling their own components or component groups. Thereby separated "motor cooling" and "electronics cooling" occur. The cooling air streams may be oriented independent of each other and oriented in axially different directions onto the components and/or housing parts to be cooled, without first being streamed onto already hot components and thereby being pre-heated. They therefore have in each case a maximum temperature difference from the components to be cooled, and can lead away the greatest amount of heat.

In a preferred embodiment, the electric motor is an internal running motor. A motor unit in its stator housing is made of a rotor, a stator with a stator laminated core radially surrounding the rotor, and arranged with a central drive shaft. Compared to an external running motor, the internal running motor has a thermal advantage in that the amount of heat from the stator and the stator winding can be led away directly over the stator housing and not via the comparatively long path over a stator bushing. In addition, in an internal running motor, the stator is not thermally capped by a rotor guard.

According to the invention, one variant of an embodiment is planned wherein the motor unit is taken in onto a bearing shield that adjoins the twin flow cooling wheel in an axial direction. At least one bearing is planned on the bearing shield to contain the drive shaft, whereby the drive shaft penetrates the gearing shield in an axial direction in a compact construction form, and is connected to the cooling wheel tight against rotating in a section lying over the bearing shield. Thereby the drive shaft of the electric motor is used simultaneously to drive the integrated cooling wheel.

The electric motor according to the invention in a first embodiment has at least a stator cooling channel, which extends in an axial direction at least partially along the stator housing and along the at least one bearing shield, and in a radial direction along the at least one bearing shield up to the cooling wheel. In a second variant of the embodiment, the stator cooling channel extends in an axial and radial direction at least partially along the at least one bearing shield up to the cooling wheel. In this second embodiment, the streaming does not effectively surround the stator housing, but only on the bearing shield adjoining the cooling wheel. However, for increased heat removal, the stator housing has cooling ribs adjoining the stator cooling channel that extend on the outside in an axial direction. In a variant of this type of embodiment, the number of components and the associated costs can be reduced. The stator cooling channel in both variants in each case is connected by a stream to the cooling wheel, and in operation is streamed through by the first cooling air stream generated by the twin flow cooling wheel ("motor cooling").

For further improved cooling, in one example of an embodiment of the invention, cooling ribs or cooling pins are formed on the bearing shield oriented to the motor unit. These increase the surface of the bearing shield and remove greater amounts of heat from the motor unit, which again is led away by the cooling stream.

On the side of the cooling wheel lying axially opposite the stator housing, the electric motor advantageously has at least one electronics cooling channel that extends at least partially along the electronics housing up to the cooling wheel in an axial and radial direction and is connected with it by the stream. In operation, the electronics cooling channel is streamed through by a second cooling air stream generated by the twin flow cooling wheel ("electronics cooling").

Both in the stator cooling channel and in the electronics cooling channel, the cooling air stream occurs in an axial direction along the stator housing or along the bearing shield and the electronics housing into or out of the direction of the cooling wheel. Depending on the direction of rotation and the blade geometry of the cooling wheel, the flow in that is dependent on the streaming direction of the cooling air stream occurs in the axial central section of the cooling wheel or the outflowing stream of the cooling air stream away from the axial central section of the cooling wheel in a radial direction, and along the channels described here extending radially.

In a variant of an embodiment with a cooling wheel that sucks in axially and blows out radially, the section of the stator cooling channel and/or of the electronics cooling channel running to the radial center of the cooling wheel is formed as a sucking in channel. This sucking in channel is formed as an advantageous embodiment optimized for streaming speeds and the volume of streams with a narrowed cross-section, which serves as an inflow nozzle in an axial sucking in section of the cooling wheel. In addition to these technical performance improvements, the inflow nozzle also reduces the increase in noise of the cooling channel when sucking in.

A variant of an embodiment of the invention is also advantageous in which the motor electronics are mounted on a conducting plate, which is arranged on the cooling wheel axially to the electronics housing, which forms at least one part of the electronics cooling channel extending in a radial direction in this area. The electronics components are thereby surrounded by the electronics housing. The cooling air stream streams along the electronics housing and indirectly cools the electronics component on the conductor plate.

In one embodiment of the invention, the electric motor is so characterized in that the stator housing and/or the electronics housing is surrounded in the direction of its motion by a cover, which at least partially form parts of the stator cooling channel and/or electronics cooling channel. The particular channels are thereby made in several parts and in each case have an inner wall, which is formed by the stator housing or the electronics housing, and an outer wall formed by the particular cover. For the cover, metal or plastic rings that are set down may be used. Instead of a cover, in an alternative variant of the embodiment, the electronics housing and/or the stator housing is formed as one piece, and thereby itself forms the inner wall and the outer wall of the corresponds cooling channel.

To optimize the cooling air streams generated by the twin flow cooling wheel, the cooling wheel has in one variant of an embodiment cover discs on both axial outer sides, which at least partially cover over the blades. The invention comprises various embodiments of the cooling wheel. In one variant, it is formed of straight blades that are independent of the direction of rotation. In an alternative variant, it has blades curved in the direction of the rotation, which may be adjusted by the air cooling streams that press or suck in.

The electric motor according to the invention is also closed and insulated against the outside according to DIN/I EC EN 60034-part 5, and fulfills standard IP protection part IPX4/IPX5 or higher. This means that the motor unit is insulated separately from the environment through the stator housing and bearing shield and that the electronics components are insulated by the electronics housing, and no air exchange is possible with the surrounding air. The cooling air streams may be brought in only from the outside to the stator housing and the bearing shields and to the electronics housing. In the same way, with the insulated embodiment, the active cooling according to the invention is especially effective and advantageous.

According to the invention, the electronics housing and the stator housing are made of heat conducting material such as die cast aluminum or continuous cast aluminum in order to lead off as much heat as possible.

All the characteristics described above are combined with one another as desired as technically possible.

Other advantageous developments of the invention are characterized in the subclaims or are further described together with a description of the preferred embodiment of the invention based on the figures. These show:

The figures are schematic as an example. They give examples of embodiments of the invention and serve for its better understanding.

DETAILED DESCRIPTION

Figure 1:
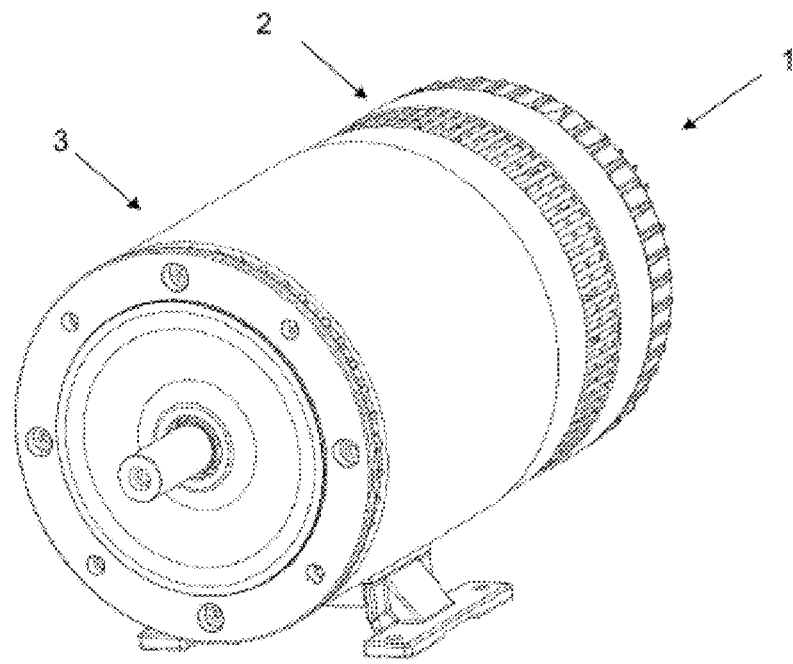
FIG. 1: a perspective view of an electric motor in a first example of an embodiment.
Figure 2:
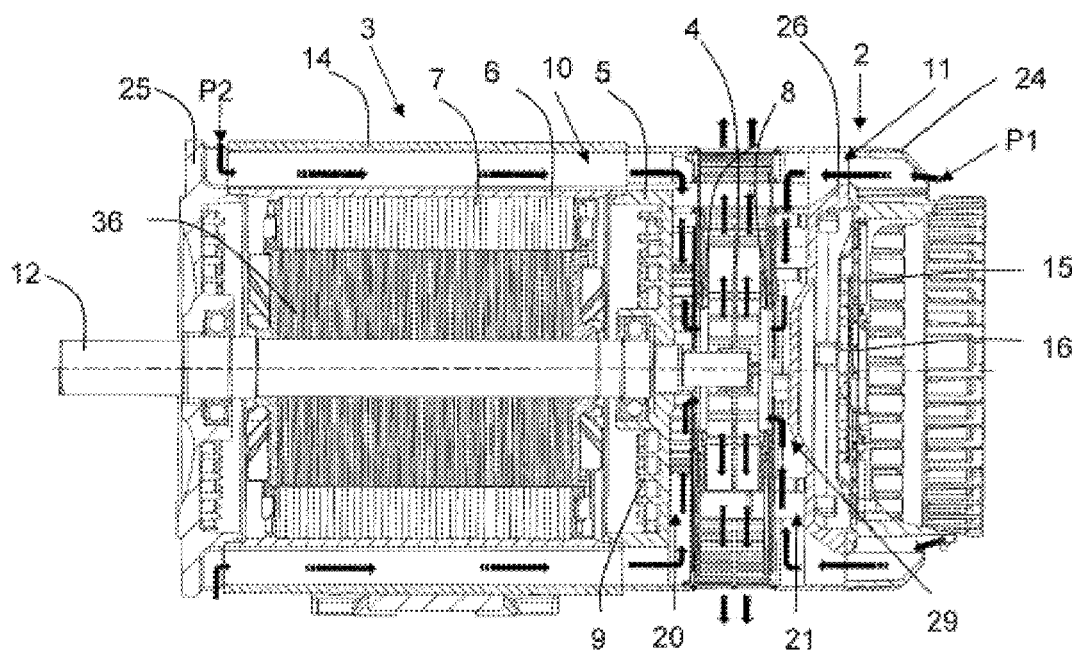
FIG. 2: a side partial view of the electric motor from FIG. 1.

FIGS. 1 and 2 show an electric motor 1 in a first variant of an embodiment in a perspective view and a side view The electric motor 1 is set up as a construction unit, and seen in the axial direction has an electronic housing 2, a twin flow cooling wheel 4, and a stator housing 3, whereby the twin flow cooling wheel 4 is arranged axially between the electronics housing 2 and the stator housing 3, with these being separated from one another. The electric motor 1 is an internal running motor, on which the rotor 36 is surrounded by a centrally arranged driveshaft 12 of the stator laminated core 7 and rotates in it. The driveshaft 12 has a double bearing, and extends in an axial direction from the outside to a planned attachment flange 25 for an operating apparatus for mounting the electric motor 1, through the bearing shield 5 to the cooling wheel 4, which is attached firmly to the driveshaft 12 and driven by it. Two layers of bearings for the storage of the driveshaft 12 are provided on the attachment flange 25 and the bearing shield 5. Cooling pins 9 are formed on the bearing shield 5 for the stator laminated core 7 and the rotor 36, which enlarge the surface of the bearing shield 5 and its heat acceptance capacity.

The stator housing 3 comprises a stator housing part 6, which together with the bearing shield 5 and the attachment flange 25 form a unit insulated against the outside. On the inside of this unit, the components of the motor unit (stator laminated core 7 and rotor 36) are received, and transfer the heat generated by operation of the motor to the stator housing part 6, the bearing shield 5, and the attachment flange 25. The bearing shield 5 forms the axial border surface against the cooling wheel 4. A cover 14 in the form of a ring is arranged around the stator housing part 6, in which a stator cooling channel 10 runs. The stator cooling channel 10 extends in an axial direction along the stator housing 3 and along the bearing shield 5 in an axial direction and also in a radial direction parallel to the cooling wheel 4.

The electronics housing 2 comprises an electronics housing part 26, in which the motor electronics 15 is accepted onto a conductor plate 16. The electronics housing part 26 is surrounded by a ring shaped cover 24, so that in between them, an electronics cooling channel 11 is formed. The electronics cooling channel 11 extends in an axial and radial direction along the electronics housing part 26, whereby the section extending radially runs parallel to the cooling wheel 4.

In operation, a first cooling air stream P1 is generated by the twin flow cooling wheel 4 along the electronics housing 2, and a second cooling air stream P2 is generated along the stator housing 3 and along the bearing shield 5 that adjoins the stator housing 3 axially. The cooling wheel 4 sucks in air axially in the central area in the embodiment that is shown, and thereby generates the two cooling air streams P1, P2 through the electronics cooling channel 11 and the stator cooling channel 10, which in the end are blown out radially from the cooling wheel 4. The direction of the air can be reversed by adjusting the blade geometry of the cooling wheel 4, that is, pressure can be performed whereby the radially sucked in air is brought in less turbulently and the amount of noise on sucking in is reduced. In both cases cooling of all components is achieved by an effective carrying away of heat.

Both the stator cooling channel 10 and the electronics cooling channel 11 have a section running radially as a sucking in channel 20, 21 to a radial center of the cooling wheel 4. In the sucking in channel, a cross-section narrowing 29 is realized by a correspondingly formed channel wall geometry, which forms an inflow nozzle in an axial sucking in area of the cooling wheel 4. The inflow nozzle, with a sucking in formation of the cooling wheel 4, allows the use of the nozzle/diffuser principle on the axial cooling wheel input for increased speed of the stream, the volume of the stream, and reduction of the noise.

Figure 3:
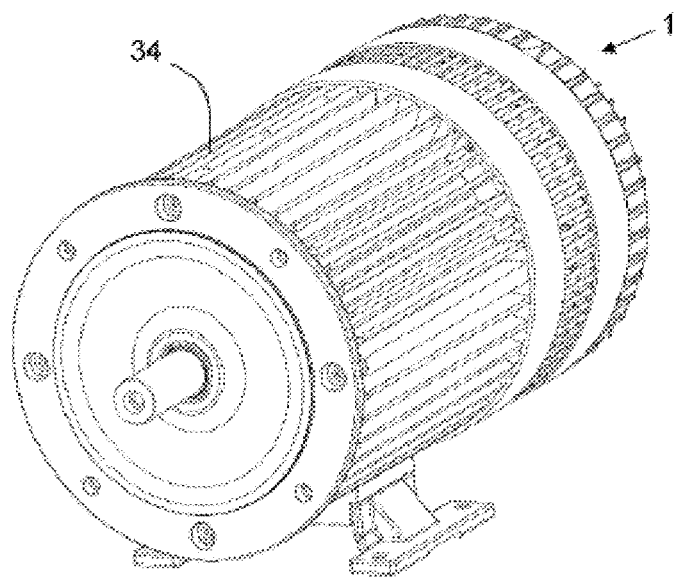
FIG. 3: a perspective view of the electric motor in a second example of an embodiment.
Figure 4:
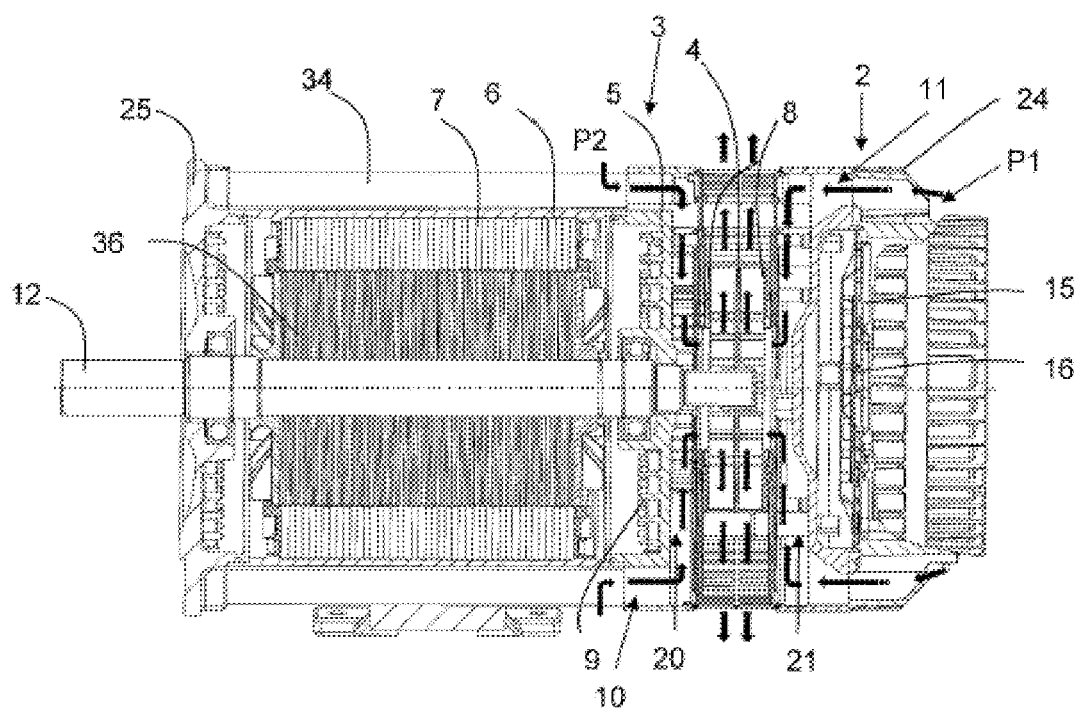
FIG. 4: a side partial view of the electric motor from FIG. 2.

FIGS. 3 and 4 show an alternative embodiment of the electric motor 1. However, all the characteristics as described below are carried out identically. In distinction to the embodiment according to FIGS. 1 and 2, the stator housing part 6 is not surrounded by a cover, but a plurality of cooling ribs 34 adjoining in the surrounding direction extend in an axial direction. The stator cooling channel 10 runs in an axial and radial direction along the bearing shield 5 up to the cooling wheel 4, but not effectively over the stator housing part 6. The second cooling air stream P2 is sucked in the area of the transition between the bearing shield 5 and the stator housing part 6, and essentially runs in a radial direction along the bearing shield 5. The actual extension of the stator cooling channel 10 is comparatively shorter.

The invention is not limited in its embodiment to the above given preferred examples of embodiments. Rather a plurality of variants is conceivable, which make use of the solution that is presented even in embodiments that are basically set up differently. For example, the stator cooling channel may also extend partially over the stator housing and the bearing shield that is arranged adjoining the cooling wheel. In addition, the stator housing part and/or the electronics housing part can be formed with a double wall, so that the cooling channels extend inside the particular components. The housing can also be made totally as a one part housing construction. Furthermore, embodiments of the invention alternatively can comprise those in which several cooling channels are planned on the stator housing and/or the electronics housing, which for example run in an axial direction in the surrounding direction.

The invention claimed is:

1. An electric motor comprising an electronics housing with motor electronics included and a stator housing set up at a distance to the electronics housing, whereby a twin flow cooling wheel is arranged axially between the electronics housing and the stator housing, which during operation generates a first cooling air stream along the electronics housing and a second cooling air stream along the stator housing, and axially along at least one bearing shield adjoining the stator housing, whereby the electric motor is characterized by at least one stator cooling channel, which extends at least partially in an axial direction along the stator housing and the at least one bearing shield and in a radial direction along the at least one bearing shield, and/or through an electronics cooling channel, which extends in the axial and radial direction at least partially along the electronics housing up to the twin flow cooling wheel.

2. The electric motor according to claim 1, wherein the twin flow cooling wheel has a blade geometry that generates the first and second cooling air streams (P1, P2) that sucks in axially and blows out radially or presses forward axially and sucks in radially.

3. The electric motor according to claim 1, wherein the electric motor is set up as an internal running motor, whereby a motor unit is formed in the stator housing and is arranged with a stator laminated core surrounding a rotor and a driveshaft.

4. The electric motor according to claim 3, wherein the motor unit is accepted on the at least one bearing shield, and the at least one bearing shield adjoins the twin flow cooling wheel in the axial direction.

5. The electric motor according to claim 4, wherein the at least one stator cooling channel, which extends in the axial and radial direction at least partially along the at least one bearing shield up to the twin flow cooling wheel.

6. The electric motor according to claim 5, wherein the electric motor is mounted on a conductor plate, which is arranged in the electronics housing axially to the twin flow cooling wheel, and the electronics housing forms at least one part of the electronics cooling channel.

7. The electric motor according to claim 1, wherein the stator cooling channel and/or electronics cooling channel comprise a section running to a radial center of the twin flow cooling wheel as a sucking in channel, which has a narrowed cross-section, which is formed as an inflow nozzle in an axial sucking in area of the twin flow cooling wheel.

8. The electric motor according to claim 1, wherein the stator housing and/or electronics housing are surrounded by a cover, which at least partially form part of the stator cooling channel and/or electronics cooling channel.

9. The electric motor according to claim 1, wherein the twin flow cooling wheel axially has bilateral cover discs.

10. The electric motor according to claim 1, wherein the twin flow cooling wheel has straight blades and is formed independent of a direction of rotation.

11. The electric motor according to claim 1, wherein the twin flow cooling wheel has curved blades oriented in a direction of rotation.

12. The electric motor according to claim 3, wherein cooling ribs or cooling pins are set up on the at least one bearing shield directed to the motor unit.

13. The electric motor according to claim 3, wherein the driveshaft is connected to the twin flow cooling wheel and is firm against rotating.

\* \* \* \* \*